US006395387B1

(12) United States Patent
Mochizuki

(10) Patent No.: US 6,395,387 B1
(45) Date of Patent: May 28, 2002

(54) TRANSPARENT FILM FOR ELECTROPHOTOGRAPHY AND TONER IMAGE FORMING METHOD USING SAME

(75) Inventor: Jun Mochizuki, Shizuoka-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/343,086

(22) Filed: Jun. 30, 1999

(30) Foreign Application Priority Data

Jul. 2, 1998 (JP) .......................................... 10-187912

(51) Int. Cl.7 .......................... B32B 5/02; B32B 27/20; B32B 27/36

(52) U.S. Cl. ....................... 428/329; 428/195; 428/206; 428/220; 428/329; 428/337; 428/480; 252/520.1; 399/297; 399/307; 399/308; 399/310; 399/314

(58) Field of Search ............................. 252/500, 518.1, 252/519.3, 519.32, 519.33, 520.1; 399/222, 252, 310, 313, 314, 297, 307, 308; 428/195, 220, 323, 327–329, 331, 332, 337, 473.5, 480, 206

(56) References Cited

U.S. PATENT DOCUMENTS

| | | | | |
|---|---|---|---|---|
| 4,374,895 A | * | 2/1983 | Yasuda et al. | 428/328 |
| 5,395,677 A | | 3/1995 | Katsumi et al. | 428/195 |
| 5,437,913 A | | 8/1995 | Asaka et al. | 428/195 |
| 5,710,965 A | * | 1/1998 | Nozawa et al. | 399/313 |

FOREIGN PATENT DOCUMENTS

| | | |
|---|---|---|
| EP | 0 778 156 | 6/1997 |
| JP | 62-94332 | 4/1987 |
| JP | 1-315768 | 12/1989 |
| JP | 6-75419 | 3/1994 |
| JP | 7-64314 | 3/1995 |

OTHER PUBLICATIONS

Patent Abstracts of Japan, JP 07 064314, vol. 199, No. 506, Jul. 31, 1995.

* cited by examiner

*Primary Examiner*—Vivian Chen
(74) *Attorney, Agent, or Firm*—Fitzpatrick, Cella, Harper & Scinto

(57) ABSTRACT

A transparent film for electrophotographic image formation thereon is formed of a transparent substrate, and a surface-coating layer disposed on at least one surface of the transparent film. The surface coating layer is characterized by exhibiting a contact angle of 55–90 deg. with pure water at 23° C. and a humidity of 50%RH; containing an electronically conductive agent as a resistivity-adjusting agent; a universal hardness of at least 150 N/mm$^2$; and exhibiting a surface resistivity of $1\times10^8$–$1\times10^{12}$ ohm/□. As a result of the specified properties, the transparent film exhibits good toner image transfer characteristic and provides images free from transfer failure, such as hollow image dropout, thin image density or discharge pattern formation.

22 Claims, 2 Drawing Sheets

TRANSPARENT FILM FOR ELECTROPHOTOGRAPHY AND TONER IMAGE FORMING METHOD USING SAME

FIELD OF THE INVENTION AND RELATED ART

The present invention relates to a transparent film suitable for formation of a toner image thereon by using a copying machine, a printer, etc., according to electrophotography, and a toner image forming method using the transparent film.

It has been generally practiced to form an image on a transparent film by using an electrophotographic copying machine and projecting the resultant image onto a screen by using an overhead projector (OHP). However, the image formation on a resinous film by electrophotography is accompanied with many problems compared with the image formation on paper. Accordingly, it has been practiced to form on the film surface a functional coating layer for solving the problems.

For example, the use of polyethylene terephthalate film as a typical transparent film for electrophotographic image formation thereon is accompanied with a known problem of conveyance failure, and for solving the problem, it has been practiced to provide an increased friction, e.g., by forming a surface coating layer containing a matting agent (Japanese Laid-Open Patent Application (JP-A) 1-315768, etc.).

Further, a polyethylene terephthalate film has a high surface resistivity, so that a high transfer bias voltage has to be applied, e.g., from a contact transfer member, in transferring a toner image on an image-bearing member, such as a photosensitive member, onto the film, and as a result thereof, defective images are liable to be formed due to abnormal discharge. In order to solve the problem, it has been practiced to suppress the surface resistivity to a certain level or below by surface-coating the film with an anti-static agent. This is also effective for suppressing conveyance failure due to charged attachment. Many proposals have been made regarding the surface resistivity adjustment. Among these, it is popular to apply anti-static agents onto film substrates. As anti-static agents, there have been proposed: ionically conducive agents, such as anionic antistatic agents, cationic antistatic agents and amphoteric antistatic agents; and electronically conductive agents, such as zinc oxide, tin oxide and titanium oxide (JP-A 62-94332, JP-A 6-75419, etc.).

As a result of image formation on such conventional films, the formation of defective images accompanied with lack of a portion of toner image, particularly in character images or thin-line images. This phenomenon is called "hollow image dropout" and is caused by a partial toner transfer failure during a transfer of toner image from a photosensitive member onto a transparent film, particularly at a thick toner portion at a middle part of a character pattern especially in case of outputting a high-resolution character image pattern, to result in a hollow image. It has been recognized that the "hollow image dropout" is particularly noticeably caused in an image forming machine adopting a contact transfer system using, e.g., a transfer roller.

Now, an example of electrophotographic image forming apparatus using a transfer roller is explained with reference to FIG. 5. Referring to FIG. 5, the image forming apparatus includes a photosensitive drum 1 as art image-bearing member, which is driven in rotation in an indicated arrow direction at a prescribed peripheral speed (process speed). During the rotation, the photosensitive drum 1 is uniformly surface-charged to a prescribed voltage of a prescribed polarity by a charger 2 (primary charging), and then exposed to image data-carrying light L supplied from imagewise exposure means (not shown), such as a laser beam scanning exposure means, or a focusing projection exposure image of an original image, to form an electrostatic latent image on its previously charged surface. The electrostatic latent image is developed by a developing device 4 to form a toner image Ta, which is transferred onto a transfer (-receiving) material P, such as a transparent film, supplied from a paper-supply means (not shown) at prescribed timing to a transfer nip n between the transfer drum 1 and a transfer roller 5 (as a contact transfer member) pressed against the drum 1, to provide a transferred toner image Tb on the transfer material P. Incidentally, the transfer material P is conveyed to and sent out from the transfer nip n along an entrance-side guide plate 6 and an exit-side guide plate 7 which are fixed to the apparatus main body.

Then, the transfer material P having passed the transfer nip n is separated from the photosensitive drum 1 surface and sent to a fixing device (not shown), where the toner image Tb is fixed onto the transfer material P to output an image product (print or copy). The surface of the photosensitive drum 1 after transfer is subject ed to removal of residual soiling substances, such as residual toner, by a cleaning device, and then recycled to a new image forming cycle starting from the primary charging. The transfer roller 5 comprises a core metal **5*a* and an electroconductive elastic layer 5*b* wound about the core metal 5*a* in the form of a roller (e.g., formed by molding). Longitudinal ends of the core metal 5*a*** (shaft) are rotatably supported by a supporting member (not shown).

The transfer drum 5 is disposed in parallel with the photosensitive drum 1, pressed against the photosensitive drum 1 surface at a prescribed pressing force and rotated at an identical peripheral speed as the photosensitive drum 1. The transfer roller 5 is supplied with a bias voltage of a polarity opposite to that of the toner image Ta on the photosensitive drum 1 from a transfer bias voltage supply 9, whereby the transfer material P introduced to the transfer nip n is electrostatically charged, and the toner image Ta on the photosensitive drum 1 is transferred onto the transfer material P to provide the transferred toner image Tb thereon.

In the above-described transfer operation, the toner transferred and the transfer material P passing the transfer nip receive a prescribed pressure from the contact transfer member, whereby the toner particles are agglomerated. At this time, if a sufficient adhesion force operates between the toner and the transfer material P, the toner image Ta is satisfactorily transferred onto the transfer material P. However, if the adhesion force between the toner and the transfer material P is weak, and a rather stronger adhesion force acts between the toner and the photosensitive drum 1, the agglomerated toner can be brought to the drum 1 side. This difficulty is more liable to occur in the case where the transfer material P is a transparent film.

SUMMARY OF THE INVENTION

An object of the present invention is to provide a transparent film for image formation thereon by electrophotography capable of providing images free from image defects, such as hollow image dropout, lower image density and discharge pattern, which are liable to be caused by transfer failure or conveyance failure.

Another object of the present invention is to provide an image forming method using such a transparent film.

According to the present invention, there is provided a transparent film for electrophotographic image formation thereon, comprising a transparent substrate, and a surface-coating layer disposed on at least one surface of the transparent film; wherein said surface coating layer exhibits a contact angle of 55–90 deg. with pure water at 23° C. and a humidity of 50%RH, contains an electronically conductive agent as a resistivity-adjusting agent, and exhibits a surface resistivity of $1\times10^{8}$–$1\times10^{12}$ ohm/□.

According to another aspect of the present invention, there is provided-an electrophotographic toner image forming method, comprising transferring a toner image on an image-bearing member onto a transfer-receiving material, and fixing the toner image on the transfer-receiving material, wherein the transfer-receiving material comprises the above-mentioned transparent film according to the present invention.

In the transparent film according to the present invention, the surface coating layer is set to have a controlled contact angle in the range of 55–90 deg. and caused to contain an electronically conductive agent a a surface resistivity-adjusting agent, thereby solving the problem of hollow image dropout. Further, the surface coating layer is set to exhibit a surface resistivity of $1\times10^{8}$–$1\times10^{12}$ ohm/□, thereby providing an improved toner transfer efficiency and preventing the occurrence of defective images due to abnormal discharge, especially during the transfer of a toner image on the image-bearing member onto a transfer-receiving material while pressing the transfer-receiving material against the toner image on the image-bearing member by a contact transfer member.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 2:
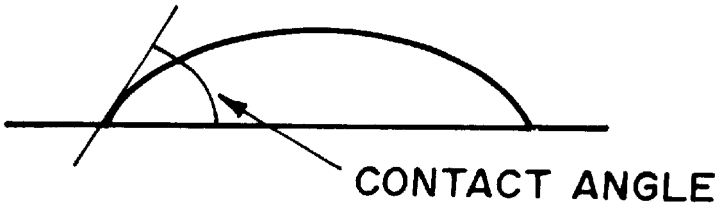
FIG. 2 is an illustration of a contact angle formed with a pure water droplet on a transparent film surface.

The transparent film according to the present invention has a surface coating layer (a (toner) image-receiving layer) showing a contact angle with pure water of 55 deg. to 90 deg. as measured in an environment of 23° C. and 50%RH. The contact angle herein refers to an angle of a tangential line on a pure water droplet (of ca. 1.8 $\mu$l in volume) gently placed on a horizontally disposed sample film at a contacting edge of the water droplet formed against the horizontal plane of the sample film as shown in FIG. 2. The contact angle values described herein are based on values measured by using a contact angle meter ("CA-X-Roll", mfd. by Kyowa Kaimen Kagaku K.K.). By providing the transparent film with a surface property exhibiting the contact angle of 50–90 deg., the formation of images free from hollow image dropout is ensured. If the contact angle is below 50 deg., the toner and the film show a low affinity for each other so that hollow image dropout is liable to occur. On the other hand, if the contact angle is in excess of 90 deg., the film shows an excessively low surface energy which subsides substantially below that of the toner, so that the attachment of the toner thereonto is liable to be insufficient, thus being liable to incur hollow image dropout. The contact angle is more preferably in the range of 60–90 deg. Another characteristic feature of the surface coating layer is that it contains an electronically conductive agent. The electronically conductive agent is found to be free from adverse effect on "hollow image" dropout unlike conventionally used surfactant-type anti-static agents.

The surface coating-layer is set to have a surface resistivity in the range of $1\times10^{8}$–$1\times10^{12}$ ohm/. Below $10^{8}$ ohm, it becomes difficult to transfer a sufficient amount of toner onto the surface coating layer, thus being liable to result in an image having a low density. In excess of $1\times10^{12}$ ohm, abnormal discharge is liable to occur especially in a low-humidity environment, thus resulting in defective images, and the film is liable to have a static electricity to adsorb dirt or dust or cause attachment of films, thus causing film supply failure.

The surface resistivity values referred to herein are based on values measured (according to JIS K6911) by using an ultra-high resistance meter ("R8340", mfd. by Advantest K.K.) at 23° C. and 50%RH.

Figure 1:
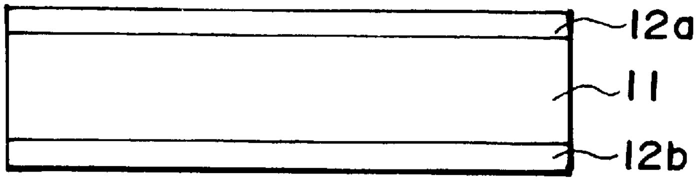
FIG. 1 is a sectional view for illustrating a basic laminate structure of a transparent film according to the invention.

FIG. 1 shows an embodiment of the transparent film according to the present invention, comprising a transparent substrate 11, and surface coating layers 12*a* and 12*b* on both surfaces of the transparent substrate 11.

The transparent substrate 11 may comprise any film-forming material which is transparent and has a heat-resistance durable against the heat for hot fixation. The material should desirably have a heat-resistant temperature of 100° C., i.e., freeness from thermal deformation at 100° C. Below 100° C., the transparent film is liable to cause a thermal deformation at the time of heat fixation of the toner image.

More specifically, example any materials for constituting the transparent substrate may include: polyesters, such as polyethylene terephthalate; cellulose esters, such as nitrocellulose, cellulose acetate, and cellulose acetate butyrate; pollysulfone, polyphenylene oxide, polyimide, polycarbonate, and polyamide. Among these, polyethylene terephthalate is particularly preferred in view of factors, such as heat-resistance, transparency and material cost.

The thickness of the transparent substrate 11 need not be particularly restricted but may preferably be on the order of 50–200 $\mu$m. Below 50 $\mu$m, the suppliability of the resultant transparent film is liable to be impaired because of insufficient stiffness, etc. On the other hand, in excess of 200 $\mu$m, the suppliability can be problematic because of excessive stiffness, and such thicknesses are also disadvantageous in view of transparency and material cost.

The surface coating layers 12*a* and 12*b* may contain an antistatic agent, a matting agent, etc., in addition to a binder.

As the antistatic or surface resistivity-adjusting agent, an electronically conductive agent is used according to the present invention. Examples of the electronically conductive agent may include: $SnO_2$, ZnO, TiO, $Al_2O_3$, $In_2O_3$, $SiO_2$, MgO, BaO and $MoO_3$. These compounds may be used singly, or in combination of two or more species, possibly in the form of a complex oxide. A preferred example thereof may comprise $SnO_2$ particles doped with, e.g., antimony. The electronically conductive agent may preferably be in the form of particles having an average particle size (Dav.) of at most 0.1 $\mu$m. A particularly preferred example may be possibly doped $SnO_2$ particles having an average particle size of 10–100 nm. The average particle size may be measured as a number-average (arithmetic average) particle size for at least 200 particles of which the primary particle size can be recognized on electron microscopic photographs. The particle sizes for the respective particles are determined as a distance between a pair of parallel lines taken in an arbitrary selected directions for the particles on a photograph so as to caliper each objective particle.

In addition to the electronically conductive agent, a known antistatic agent can be added within an extent of not adversely affecting the present invention. Examples of such known anti-static agents may include: anionic antistatic agents, such as polyacrylic acid salts, polymethacrylic acid salts, polystyrenesulfonic acid salts, and styrene-maleic acid copolymers; cationic antistatic agents, such as sulfonic acid salts, sulfate ester salts, and phosphate ester salts; amphoteric anti-static agents, such as alkyldimethylbetaine; nonionic antistatic agent, such as higher fatty alcohols, alkylphenols, amines, and ethylene oxide addition products of phosphate.

Examples of the matting agent may include: particles of fluorine-containing resins; low-molecular weight polyolefin-type organic polymers, such as polyethylene, paraffin or microcrystalline waxes, possibly recovered from emulsions; inorganic compounds, such as $SiO_2$, $Al_2O_3$, talc, and kaolinite; beads of plastic materials, such as crosslinked polymethyl methacrylate, and polystyrene. These matting agent particles may preferably have an average particle size (Dav.) of 1–20 $\mu$m, as measured by a laser-scattering optical particle size meter (e.g., "MICROTRACK", mfd. by Nikkiso K.K.). A large particle size may be preferred in order to better suppress the simultaneous feed of a plurality of transparent film sheets, but is liable to result in an increased haze of the resultant transparent film.

Examples of the binder material may include: water-soluble polymers, such as polyvinyl alcohol, polyacrylic acid, polyacrylamide, polyhydroxyethyl acrylate, polyvinylpyrrolidone, water-soluble polyester, water-soluble polyurethane, water-soluble nylon, water-soluble epoxy resin, gelatin, hydroxyethylcellulose, hydroxypropylcellulose, carboxymethylcellulose, and derivatives of these; aqueous dispersion-type resins, such as aqueous dispersed acrylic resins and aqueous dispersed polyesters; emulsions, such as acrylic resin emulsion, polyvinyl acetate emulsion, and styrene-butadiene rubber emulsion; and organic solvent-soluble resins, such as acrylic resins, and polyester resins. These resins can be crosslinked further.

Figure 6:
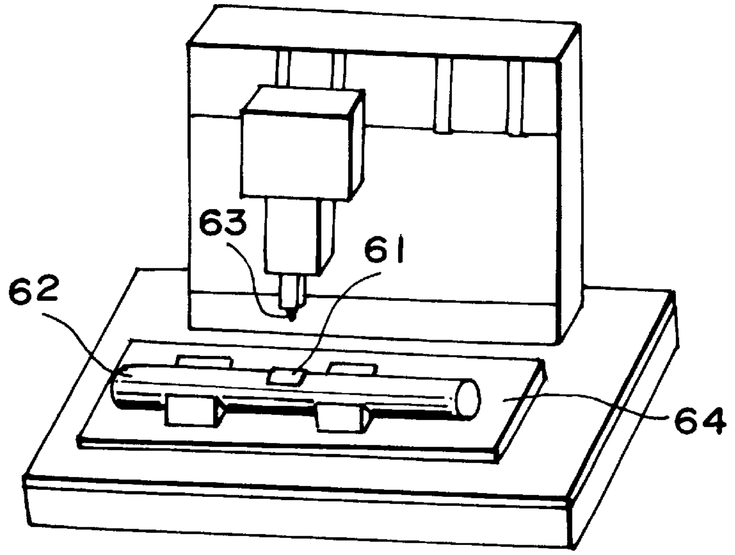
FIG. 6 is a schematic perspective view for illustrating a surface coating film tester used for defining the transparent film of the invention.

Further, in order to more effectively prevent the hollow image dropout, the surface coating layer 12*a* or/and 12*b* may preferably exhibit a universal hardness of at least 150 $N/mm^2$, more preferably at least 160 $N/mm^2$, as measured at a diamond indenter penetration of 1 $\mu$m in an environment of 23° C. and 50%RH. The universal hardness values referred to herein are based on values measured in the following manner (according to DIN50359-1-Germany or as proposed in ISO Technical Report TRI 14577) by using a universal hardness tester as shown in FIG. 6 (e.g., "Fischer Scope H100", mfd. by Helmut Fischer Co.). More specifically, a sample film 61 is fixed onto a sample holder 62 on a movable base 64, and a diamond pyramid indenter (Vickers indenter) 63 having a tetra-angular tip having an apex angle of 136 deg. between each pair of opposing faces is gradually moved downward and caused to penetrate under a stepwise increasing pressure to the film 61. During the moving, the penetration depth is electrically detected, and the load on the indenter at each penetration is detected by a load cell, whereby the universal hardness is measured as a load applied to the intender at a set maximum penetration depth (of 1 $\mu$m herein) divided by an area of the indenter at the penetration depth.

The surface coating layer 12*a* or/and 12*b* may for example be formed by preparing a coating liquid by dispersing or dissolving the above-mentioned binder, electronically conductive agent, matting agent, etc., and applying the coating liquid onto one or both surfaces of the transparent substrate 11. The application of the coating liquid may be performed by any known means, such as an air doctor coater, a blade coater, a rod coater, a knife coater, a squeeze coater, or a bar coater. The hardness of the surface coating layer may appropriately be controlled, e.g., by adding a hardener or a curing agent of the binder into the coating liquid and adjusting the heating time after the formation of the surface coating layer.

The surface coating layer can be formed in a widely ranging thickness but may preferably be formed in a thickness of 0.01–10 $\mu$m. Too small a thickness may pose a problem in toner fixability or formability of the surface coating layer by application. On the other hand, too large a thickness is liable to cause a surface softening leading to an increased liability of winding of the transparent film about the heat-fixing member, such as a roller or a fixing film, and also incurs an increased production cost. More specifically, a coating layer thickness of 0.1–2 $\mu$m is preferred for a transparent film for monochromatic toner image formation thereon expected to receive a relatively smaller amount of transferred toner, and a coating layer thickness of 1–10 $\mu$m is preferred for a transparent film for color toner image formation thereon expected to receive a larger amount of transferred toner and provide a smooth surface of the fixed toner image showing a high transmittance with suppressed optical scattering by sufficiently embedding the transferred toner into the surface coating layer in the fixing step.

Figure 3:
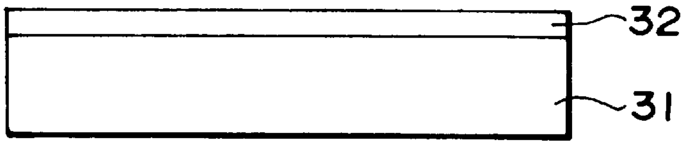
FIGS. 3 and 4 are respectively a sectional view showing a laminate structure of an embodiment of the transparent film according to the invention.
Figure 4:
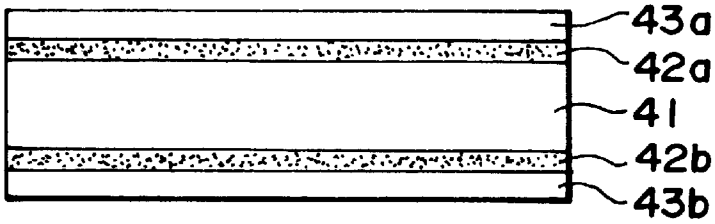

The surface coating layer can further contain known additive materials, as desired, such as an anti-oxidant, a colorant, and an ultraviolet absorber. Further, as the laminar structure of the transparent film according to the present invention, in addition to the one shown in FIG. 1 including one surface coating layer (11), various modifications are possible within the scope of the present invention, including one shown in FIG. 3 including a surface coating layer 32 formed on only one surface of transparent substrate 31 which may require a discrimination between two surface (i.e., with or without a surface coating layer (image-receiving layer)) in use thereof but may be produced at a lower production cost, and one shown in FIG. 4 wherein the surface coating layer on either one or both surfaces of a transparent substrate 41 is divided into a plurality of layers, e.g., an electroconductive layer (42*a*, 42*b*) and an image-receiving layer (43*a*, 43*b*) formed thereon. The laminate structure of FIG. 4 may allow a larger latitude of material selection. In this case, the electronically conductive agent may be added to both of the electroconductive layer (42*a*, 42*b*) and the image-receiving layer (43*a*, 43*b*).

EXAMPLES

Hereinbelow, the present invention will be described more specifically based on Examples.

Example 1-1

Onto both surfaces of a 100 μm-thick biaxially stretched polyethylene terephthalate film ("F56", Toray K.K.), a coating liquid of the following composition was applied by a bar coater at a coating speed of 20 m/min., followed by drying at 120° C. for 30 sec., to form a transparent film having a 0.2 μm-thick surface coating layer 6n both surfaces.

| | |
|---|---|
| Binder: water-soluble polyester (Tg = 65°) ("WAC-20" (trade name), mfd. by Takamatsu Yushi K.K.) | 10 wt. parts |
| Conductive agent: $SnO_2$ (Dav. = 10 nm) | 4 wt. parts |
| Matting agent: $SiO_2$ (Dav. = 10 μm) | 2 wt. parts |
| Pure water | 84 wt. parts |

Example 1-2

A transparent film was prepared in the same manner as in Example 1-1 except that the TiO (Dav.=10 nm) was used as an electronically conductive agent instead of the $SnO_2$.

Comparative Example 1-1

A transparent film was prepared in the same manner as in Example 1-1 except that the $SnO_2$ as an electronically conductive agent was replaced by an anionic surfactant ("PRISURF A212C", mfd. by Daiichi Kogyo Seiyaku K.K.).

Comparative Example 1-2

A transparent film was prepared in the same manner as in Example 1-1 except that the $SnO_2$ as an electronically conductive agent was replaced by a nonionic surfactant ("DERECTOL RL", mfd. by Meisei Kagaku K.K.).

Figure 5:
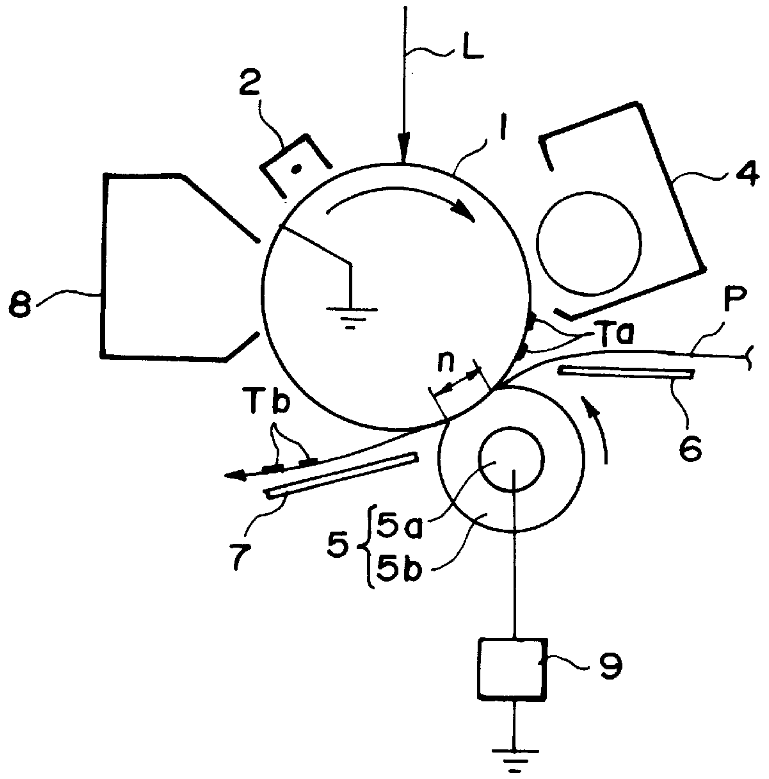
FIG. 5 is a schematic illustration of an electrophotographic image forming apparatus using a transfer roller.

Each of the above-prepared transparent films was subjected to measurement of a contact angle, a universal hardness and a surface resistivity respectively in the above-described manners and also subjected to an image forming test for evaluation of hollow image dropout on character images and thin-line images by using a commercially available copying machine ("NP 6030", mfd. by Canon K.K.) having an organization similar to the one described with reference to FIG. 5 except for the use of a roller charger instead of the corona charger 2.

The evaluation of hollow image dropout was performed according to the following standard based on the number of hollow image dropout parts per 50 character images each in a character size of 16 point:

A: dropout at 0 part per 50 characters

B: dropout at 1–5 part per 50 characters

C: dropout at 6–10 part per 50 characters

D: dropout at 11–15 part per 50 characters

E: dropout at 30 part or more per 50 characters

The results are inclusively shown in the following Table 1.

TABLE 1

| Ex. & Comp.Ex. | Ex.1-1 | Ex.1-2 | Comp. Ex.1-1 | Comp. Ex.1-2 |
|---|---|---|---|---|
| Hollow image dropout | B | C | E | E |
| Contact angle (deg.) | 70 | 65 | 35 | 20 |
| Surface resistivity (ohm/□) | $1.3 \times 10^{10}$ | $2.60 \times 10^{10}$ | $9.73 \times 10^{9}$ | $5.69 \times 10^{10}$ |
| Universal hardness ($N/mm^2$) | 140 | 140 | 105 | 105 |

Example 2-1

Onto both surfaces of a 100 μm-thick biaxially stretched polyethylene terephthalate film ("F56", Toray K.K.), a coating liquid of the following composition was applied by a bar coater at a coating speed of 20 m/min., followed by drying at 120° C. for 30 sec., to form a transparent film having a 0.2 μm-thick surface coating layer on both surfaces.

| | |
|---|---|
| Binder: aqueous dispersion-type polyester (Tg = 75°) ("WR-905" (trade name), mfd. by Nippon Gosei Kagaku Kotyo K.K.) | 8 wt. parts |
| Conductive agent: $SnO_2$ (Dav. = 10 nm) | 4 wt. parts |
| Matting agent: $SiO_2$ (Dav. = 6 μm) | 1.5 wt. parts |
| Pure water | 86.5 wt. parts |

The thus obtained transparent film was subjected to :further heat-treatment in an oven at 150° C. for 60 sec.

Example 2-2

A transparent film was prepared in the same manner as in Example 2-1 except that the heat treatment at 150° C. was performed for 30 sec.

Example 2-3

A transparent film was prepared in the same manner as in Example 1-1 except that the heat-treatment was performed at 130° C. for 15 sec.

Example 2-4

A transparent film was prepared in the same manner as in Example 2-1 except that the heat treatment after the formation of the surface coating layer was omitted.

Each of the above-prepared transparent films was subjected to measurement of a contact angle, a universal hardness and a surface resistivity respectively in the above-described manners and also subjected to the image forming test of hollow image dropout in the same manner as in Example 1.

TABLE 2

| Ex. & Comp.Ex. | Ex.2-1 | Ex.2-2 | Ex.2-3 | Ex.2-4 |
|---|---|---|---|---|
| Hollow image dropout | A | B | D | D |
| Contact angle (deg.) | 65 | 60 | 58 | 58 |
| Surface resistivity (ohm/□) | $2.13 \times 10^{10}$ | $1.18 \times 10^{10}$ | $9.54 \times 10^{9}$ | $3.82 \times 10^{10}$ |
| Universal hardness ($N/mm^2$) | 170 | 162 | 141 | 112 |

Example 3

Onto both surfaces of a 100 μm-thick biaxially stretched polyethylene terephthalate film ("F56", Toray K.K.), a coating liquid of the following composition was applied by a gravure coater at a coating speed of 50 m/min., followed by drying at 160° C. for 15 sec., to form a transparent film having a 0.2 μm-thick surface coating layer on both surfaces.

| | |
|---|---|
| Binder<br>polyester resin (Tg = 67° C.)<br>("Vylon-200", mfd. by Toyobo K.K.) | 11.5 wt. parts |
| Conductive agent:<br>$SnO_2$ (Dav. = 10 nm) | 4 wt. parts |
| Matting agent:<br>polymethylmethacrylate resin<br>particles (Dav. = 6 μm) | 2 wt. parts |

The thus-obtained transparent film was evaluated in the same manner as in Example 1. The results are shown in the following Table 3.

TABLE 3

| Ex. & Comp.Ex. | Ex.3 |
|---|---|
| Hollow image dropout | B |
| Contact angle (deg.) | 70 |
| Surface resistivity (ohm/□) | $2.50 \times 10^{10}$ |
| Universal hardness ($N/mm^2$) | 135 |

What is claimed is:

1. A transparent film for electrophotographic image formation thereon, comprising:

a transparent substrate; and an outermost surface-coating layer disposed on at least one surface of the transparent film;

wherein said outermost surface coating layer:

exhibits a contact angle of 55–90 deg. with pure water at 23° C. and a humidity of 50%RH, contains an electronically conductive agent as a resistivity-adjusting agent, exhibits a surface resistivity of $1\times10^{8}$–$1\times10^{12}$ ohm/□, and exhibits a universal hardness of at least 150 $N/mm^2$ as measured at a diamond indenter penetration of 1 μm in an environment of 23° C. and 50%RH.

2. A transparent film according to claim 1, wherein said surface coating layer exhibits a contact angle in the range of 60–90 deg.

3. A transparent film according to claim 1, wherein said surface coating layer exhibits a universal hardness of at least 160 $N/mm^2$.

4. A transparent film according to claim 1, wherein said surface coating layer has been subjected to a heat treatment for providing the universal hardness.

5. A transparent film according to claim 1, wherein said surface coating layer comprises matting agent particles.

6. A transparent film according to claim 5, wherein said matting agent particles halve an average article size in the range of 1–20 μm.

7. A transparent film according to claim 1, wherein said transparent substrate comprises a polyester film.

8. A transparent film according to claim 1, wherein said transparent substrate has a thickness in the range of 50–200 μm.

9. A transparent film according to claim 1, wherein said electronically conductive agent is in the form of particles having an average particle size no larger than 0.1 μm.

10. A transparent film according to claim 1, wherein said electronically conductive agent comprises $SnO_2$ particles.

11. An electrophotographic toner image forming method, comprising the steps of:

transferring a toner image on an image-bearing member onto a transfer-receiving material; and fixing the toner image on the transfer-receiving material, wherein the transfer-receiving material is a transparent film comprising;

a transparent substrate; and an outermost surface-coating layer disposed on at least one surface of the transparent film; and wherein said outermost surface coating layer:

exhibits a contact angle of 55–90 deg. with pure water at 23° C. and a humidity of 50%RH, contains an electronically conductive agent as a resistivity-adjusting agent, exhibits a surface resistivity of $1\times10^{8}$–$1\times10^{12}$ ohm/□, and exhibits a universal hardness of at least 150 $N/mm^2$ as measured at a diamond indenter penetration of 1 μm in an environment of 23° C. and 50%RH.

12. A toner image forming method according to claim 11, wherein the toner image on the image-bearing member is transferred onto the transfer-receiving material while pressing the transfer-receiving material against the toner image on the image-bearing member by a contact transfer member supplied with a bias voltage having a polarity opposite to a polarity of the toner image.

13. A toner image forming method according to claim 12, wherein the contact-transfer member is a transfer roller.

14. A toner image forming method according to claim 11, wherein said surface coating layer exhibits a contact angle in the range of 60–90 deg.

15. A toner image forming method according to claim 11, wherein said surface coating layer exhibits a universal hardness of at least 160 $N/mm^2$.

16. A toner image forming method according to claim 11, wherein said surface coating layer has been subjected to a heat treatment for providing the universal hardness.

17. A toner image forming method according to claim 11, wherein said surface coating layer comprises matting agent particles.

18. A toner image forming method according to claim 17, wherein said matting agent particles have an average article size in the range of 1–20 μm.

19. A toner image forming method according to claim 11, wherein said transparent substrate is a polyester film.

20. A toner image forming method according to claim 11, wherein said transparent substrate has a thickness in the range of 50–200 μm.

21. A toner image forming method according to claim 11, wherein said electronically conductive agent is in the form of particles having an average particle size no larger than 0.1 μm.

22. A toner image forming method according to claim 11, wherein said electronically conductive agent comprises $SnO_2$ particles.

* * * * *

UNITED STATES PATENT AND TRADEMARK OFFICE

CERTIFICATE OF CORRECTION

PATENT NO. : 6,395,387 B1
DATED : May 28, 2002
INVENTOR(S) : Jun Mochizuki

It is certified that error appears in the above-identified patent and that said Letters Patent is hereby corrected as shown below:

Column 1,
Line 64, "art" should read -- an --.

Column 2,
Line 24, "subject ed" should read -- subjected --.

Column 3,
Line 12, "provided-an" should read -- provided an --; and
Line 22, "a" (first occurrence) should read -- as --.

Column 4,
Line 19, "ohm/." should read -- ohm/□. --;
Line 40, "freeness" should read -- being free --;
Line 44, "any" should be deleted; and
Line 48, "pollysulfone," should read -- polysulfone, --.

Column 7,
Line 8, "6n" should read -- on --.

Column 10,
Line 14, "halve" should read -- have --; and "article" should read -- particle --; and
Line 35, "comprising;" should read -- comprising: --.

UNITED STATES PATENT AND TRADEMARK OFFICE

CERTIFICATE OF CORRECTION

PATENT NO. : 6,395,387 B1
DATED : May 28, 2002
INVENTOR(S) : Jun Mochizuki

It is certified that error appears in the above-identified patent and that said Letters Patent is hereby corrected as shown below:

Column 11,
Line 8, "article" should read -- particle --.

Signed and Sealed this

Twenty-second Day of October, 2002

*Attest:*

JAMES E. ROGAN

*Attesting Officer*

*Director of the United States Patent and Trademark Office*